May 5, 1953  H. W. JEWELL  2,637,346
RESISTANT PIPE AND CONDUIT CONSTRUCTION
Filed Dec. 14, 1949  2 SHEETS—SHEET 1

INVENTOR.
HOWARD W. JEWELL,
BY
ATTORNEY

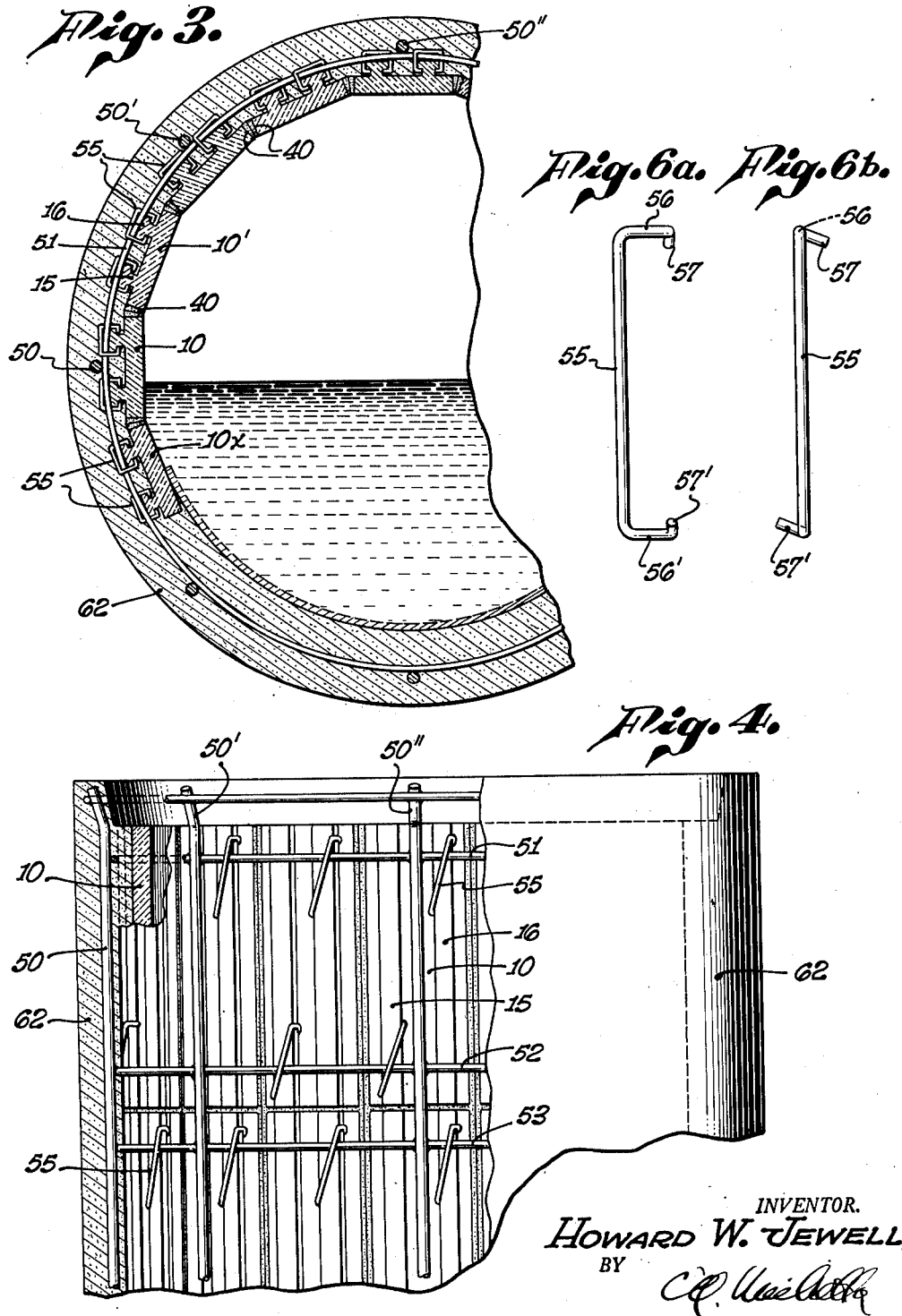

Patented May 5, 1953

2,637,346

UNITED STATES PATENT OFFICE 2,637,346

RESISTANT PIPE AND CONDUIT CONSTRUCTION

Howard W. Jewell, Los Angeles, Calif., assignor to Pacific Clay Products, Los Angeles, Calif., a corporation of California Application December 14, 1949, Serial No. 132,889

8 Claims. (Cl. 138—86)

This invention relates to the construction of large pipe and conduit or tanks and is particularly directed to an economical method of manufacturing large pipe, such as that used in the construction of sewers, wherein the pipe must have exceptional resistance to the action of industrial wastes, organic solvents, acids and alkalies. Tanks such as cesspools, thickeners, sediment tanks and storage tanks may also be made in accordance with the disclosures given hereinafter, since such tanks are, in effect, sections of substantially cylindrical forms.

Experience has shown that ceramic pipe, such as glazed clay pipe, is eminently suited for the conveyance of industrial wastes, sewage, etc. Such clay pipe (whether bell end, straight end or rabbeted end pipe) can only be made in relatively short lengths and of diameters not exceeding about 24 in. or 30 in. Larger conduits, sewers, etc. are generally made of concrete and are lined with tile or other clay composition liners, but the cost of lining a tunnel and the cost of erecting the concrete tunnel in the first place renders the cost per foot extremely high. Moreover, great difficulty has been encountered in placing clay liners in proximity to each other and in preventing the corrosive liquors from percolating through the joints. It is to be remembered that industrial wastes are often acidic, at times alkaline and in some instances, quantities of organic liquids, solvents, gasoline, etc. pass through the sewers, all of these chemicals and substances exerting detrimental effects upon the lining and particularly the joints between the lining tiles.

The present invention is directed toward improvements in the construction of pipe and conduit of relatively large diameters, the resulting pipe or conduit being capable of manufacture in relatively long lengths so as to permit transportation of these lengths from a central point of assembly onto the job. It is to be understood that the invention is not limited to the manufacture of pipe or conduit which is perfectly circular in cross section; conduits having a semicircular cross section, arch section, or other curved cross section may also be manufactured. Furthermore, the invention is not limited to the manufacture of conduits or conduit-like shapes which are completely lined with a resistive inner surfacing, since the bottom portion of the conduit, which is normally completely covered by the flowing stream of sewage or waste, need not be lined, greatest corrosive and pitting effect taking place at the surface of the flowing stream of waste, permitting the use of linings which only cover the sides and top of a conduit while the bottom remains uncovered.

Generally stated, the invention relates to the construction of conduits of relatively large diameter and large length wherein ceramic liners provided with a resistant face are positively held within a rigid cage made from longitudinally extending and circumferentially extending rods of metal. This assembly is then provided with a monolithic external layer of cementitious composition in contact with the rear faces of the ceramic liners, said composition not only completely enclosing the cage but also preferably keying onto suitable ribs or lugs formed in the rear faces of the ceramic liners.

The invention also relates to means and methods of constructing these relatively large diameter conduits in an accurate and facile manner, the resulting structure being capable of shipment from the place of manufacture to the site where the conduit is to be used without breakage or fracture. Preformed sections of conduit made in accordance with the present invention may be lowered into pits to act as cesspools, septic tanks, etc. Each section of conduit may be provided with rabbeted ends, permitting adjoining and aligned sections of the conduit to be readily connected when it is desired to form a long, outfall sewer or the like.

The invention also contemplates ceramic liners provided with a bonding member carried by the sides and ends of the liner, the bonding members being formed with external surfaces lying in planes coincidental with the radial planes passing through the center of a curved conduit, whereupon adjacent liners installed in the wire cage described hereinbefore contact each other along their sides and edges and form impervious seals which prevent the passage of corrosive liquids and fumes through the joints into active contact with the cementitious material forming the external coating on the conduits.

The present invention, therefore, has as one of its principal objects the provision of a prefabricated conduit lined with ceramic liners having resistant inner faces.

A further object of the invention is to disclose and provide a method of construction whereby conduits of large diameter and any desired length may be constructed in a ready and facile manner.

A still further object of the invention is to disclose and provide means and methods of preparing ceramic liners for the purpose of insuring a proper positioning of the liners in adjoining relation upon the inner surface of a conduit to the end that a smooth surface is obtained and moisture-proof joints are formed between the various liners.

These and various other objects and advantages of the invention will become apparent to those skilled in the art from the following description of certain exemplary forms and means which can be utilized in carrying out the teachings hereof. Certain preferred constructions and methods of procedure will be described hereinafter for exemplary purposes and in connection therewith reference will be had to the appended drawings, in which:

Fig. 3 is a transverse section through approximately one-half of a conduit made in accordance with the present invention.

Fig. 4 is a side elevation, partly broken away, of an end portion of a conduit made as herein described.

Figs. 6a and 6b are side and end views, respectively, of one form of clip which may be employed.

Figure 2:
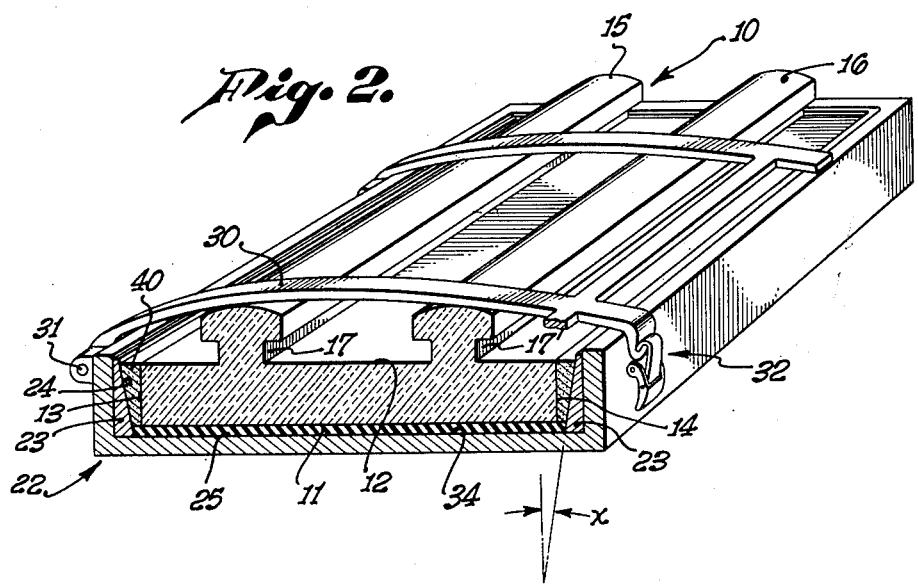
Fig. 2 is a perspective view, partly in section, illustrating one of the molds employed in the method illustrated in Fig. 1.
Figure 5:
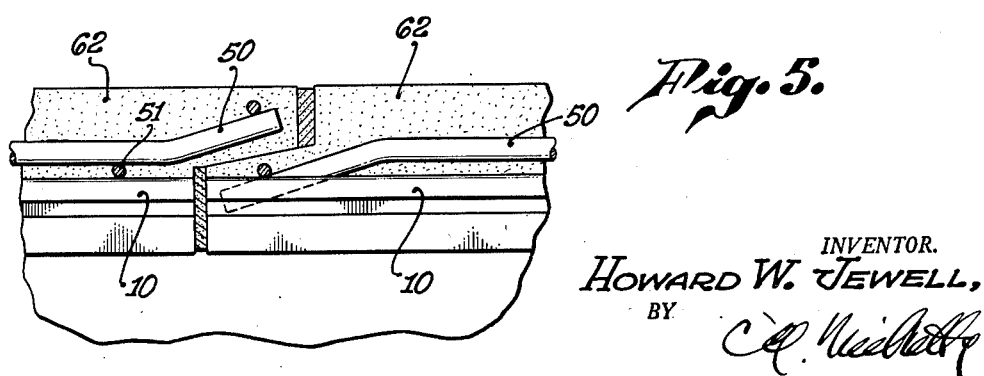
Fig. 5 is an enlarged view, in longitudinal section, through a joint between adjacent sections of pipe.

Although clay liners used in carrying out the method of construction of this invention may vary greatly in size and form, the exemplary form illustrated in Fig. 2 has been found to be eminently suited. This ceramic liner generally indicated by the numeral 10 is preferably a substantially vitrified clay composition liner (most economically made by extrusion, burning and glazing in well-known manners), such liner being provided with a resistant front face 11 (preferably glazed), an unglazed rear face 12 and longitudinally extending sides and transverse ends, the sides being indicated at 13 and 14. The clay liner preferably carries on its rear face 12 one or more longitudinally extending, headed ribs or lugs, such as the ribs 15 and 16, these ribs being preferably integral with the body of the liner. The contour of these lugs or ribs may vary but they are preferably headed, that is, the longitudinally extending sides are recessed or undercut or provided with grooves, such as the grooves 17 and 17'.

Since the longitudinal sides 13 and 14 lie in planes perpendicular to the front face 11, they could not be placed in adjoining relationship against a curved face without leaving appreciable space between opposing sides of adjacent liners. Furthermore, during the normal manufacturing operations, such as extrusion, drying and burning, many ceramic liners 10 would slightly warp, so that the front face 11 does not lie in a common plane. In some instances, the front face 11 may have a concave, cylindrical surface imparted thereto, the radius of curvature lying in a plane passing along the longitudinal axis of the liner, but even these tile would in many instances be warped so that the longitudinal edges on face 11 would not lie in a common plane. If the face 11 or its longitudinal edges are not in a common plane, then when such tile are used in lining a large conduit certain edges or corners would protrude from the wall of the conduit, thereby creating turbulent flow and in many instances permitting such protruding corners to be broken off by floating debris. Such protruding corners are more subject to attack by the corrosive liquids in the sewer.

It is therefore important that the liners be provided with faces which lie in a common plane or positive means be provided whereby the liner, upon installation, will respond as if it were a perfect liner with a plane, unwarped face.

In order to permit the utilization of substantially all glazed ceramic liners manufactured and at the same time insure accurate positioning of the liners with respect to each other within a conduit, each liner is provided with bonding members having outer surfaces in planes radial with respect to the curvature of the conduit. This will be most clearly understood from a contemplation of Figs. 1 and 2 wherein the method of treating the liners 10 is illustrated.

Figure 1:
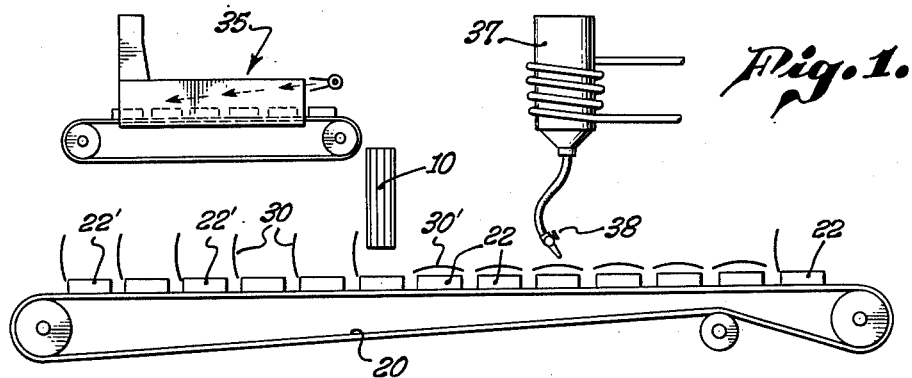
Fig. 1 is a diagrammatic representation of an arrangement which may be used in the manufacture of a preferred form of pretreated ceramic liner.

As shown in Fig. 1, the apparatus may comprise a continuous belt 20 mounted upon suitable end rollers and driven in any suitable manner at a speed correlated with the operations being carried out. The conveyor carries a multiplicity of molds 22 each provided with a recess. In practice, each recess is provided with a molding frame 23 capable of being received in the recess of the mold 22, the inner longitudinally extending faces 24 of the frame being inclined to the bottom 25 of the mold. The angle of inclination depends upon the radius of the conduit in which the liner 10 is to be used and since such angle, indicated at $x$, may vary (depending upon the diameter of the conduit being manufactured), the frames 23 being removable from the mold 22 permit the molds to be used in the manufacture of liners adapted for conduits of various diameters, it only being necessary to substitute a frame provided with a differently inclined face for the one previously employed. The faces 24 lie in planes which preferably pass through the center of curvature of the conduit to be made.

These various molds 22 are provided with a closure 30 pivotally connected to one longitudinal side of the mold 22 as at 31. The opposing longitudinal side of mold 22 is supplied with any suitable locking device 32 capable of engaging the outboard end of the closure 30 so as to tighten the closure against a liner within the mold.

Open molds are indicated at 22' upon the conveyor 20. A sheet of rubber 34 is placed within the bottom of the open mold and a ceramic liner 10 preferably, but not necessarily, preheated in a preheater 35 is then placed upon the sheet of rubber 34 within the mold 22. The closure 30 is then closed into the position indicated at 30' in Fig. 1 and considerable pressure is exerted by the closure 30 against the upper surface of the ribs 15 and 16. Since the bottom 25 of the mold is a flat plane and the sheet of rubber 34 is of uniform thickness, such sheet of rubber composition absorbs any inequalities or warping which may be present in the face 11 of the liner.

As these various closed molds containing their liners are moved by the conveyor 20 toward the discharge end, the molds are filled with a suitable bonding material. The bonding material employed may be a rubber composition, an asphaltic composition, or any other bonding agent which is resistant to the action of solvents, acids, alkalies or the bacterial decomposition which is engendered by sewage. Asphaltic compositions have been found eminently suited and such asphaltic compositions may be reduced to liquid form in a heated storage tank 37 from which such composition is dispensed by means of a flexible hose provided with a valved outlet 38. This composition is poured between the longitudinally extending edges 13 and 14 of the liner 10 and the inclined faces 24 of the frame 23, as well as between the end faces of the frame 23 and the ends of the liner 10. The end faces of the frame 23 are parallel and perpendicular to the bottom 25 of the mold 22. It is to be understood that the liner 10 is carefully positioned within the mold 22 so as to permit the formation of a bonding member of appropriate thickness around the entire tile. The bonding member thus formed is illustrated at 40 and since the asphaltic composition sets upon cooling, the closure 39 may be opened near the discharge end of the conveyor 20 and the liner 10 removed from the mold, together with its adhering bonding members, said bonding members covering both the longitudinally extending sides as well as the ends of the liner. The molds may be returned to the feed end of the conveyor 20 for reuse in the manner indicated. It will be appreciated that preheating of the liners 10 facilitates adherence of the bonding members 40 to the ceramic liner. In some instances it may be desirable to spray the faces 24 of the frame within the mold 22 in order to obviate undesired adherence of the bonding material to the surfaces of the frame. It may also be noted at this time that the bonding members are preferably made from a composition which becomes tacky or softens somewhat at elevated temperatures, for reasons which will be best understood from subsequent description.

One manner of employing the novel article of commerce, namely the prepared ceramic liner described hereinabove, will be now described, Figs. 3 and 4 illustrating portions of a completed concrete pipe or conduit lined with the ceramic liners.

In the manufacture of a concrete pipe or conduit, in accordance with the present invention, a cage is first made, said cage including a plurality of longitudinally extending reenforcing bars such as 50, 50' in parallel, spaced relation, such bars being connected to circumferentially extending curved rods, such as 51, 52, 53, etc. These curved rods 51 and 52 are preferably spaced from each other in such manner that a single ceramic liner will contact at least two of the rods. It will be evident that the spacing of the circumferential rods 51, 52, etc. will therefore depend upon the length of the ceramic liners employed. The circumferential curved rods 51 and 52 may be deformed so as to interlock with the longitudinally extending, substantially parallel, spaced rods 50, 50' or they may be welded thereto. Tie wires may be used in suitably connecting the circumferential rods to the longitudinally extending rods. At all events, the resulting cage should be rigid and it is important that the radius of curvature or the diameter of the circumferentially extending rods 51 and 52 be maintained to fairly close tolerances.

As indicated in Fig. 4, the ends of the longitudinally extending rods such as the rod 50 may be bent either outwardly or toward the center of the conduit so as to permit the formation of a slip joint or rabbetted joint at the ends of the pipe.

Clay liners 10, 10', etc. are now fastened to the inside of the cage. Preferably the liners are positioned with their longitudinal edges parallel to the axis of the cage and conduit to be made. Each ceramic liner is firmly attached to the cage by means of clips cooperating with the headed ribs or lugs 15, 16 of a liner. Although various forms of clpis may be employed, the form illustrated in Figs. 6a, 6b has been found to be very economical and effective. The clip there illustrated is made of heavy wire, the body portion of the clip 55 being straight and terminating at each end in a downwardly extending leg 56, the end of one leg being bent at right angles and in one direction as indicated at 57, while the end of the other leg 56' is bent outwardly and in an opposite direction, as indicated at 57'. These short, outwardly directed ends 57 and 57' may be inclined slightly upwardly so as to form an included angle between a leg 56 and the end 57 of slightly less than 90°.

A clip such as 55 holds the liner against the curved, circumferentially extending rod 51 by straddling the rod 51 and a rib or lug 15, the short end portions 57 and 57' engaging the grooves 17 and 17' of the rib. It may be noted that the body portion of the clip 55 is materially longer than the width of a rib, permitting a certain amount of flexure in the body portion whereby a tight hold is exerted upon the wire.

As best illustrated in Fig. 4, the circumferentially extending rods 51 and 52 are not uniformly spaced longitudinally of the conduit or cage, but appear to be in pairs. This permits each clay liner to be attached to the cage at zones near the ends of the liner, overhanging or cantilever action being eliminated.

When the liners are attached to the inner surface of the cage, the outer surfaces of the bonding members 40 carried by each liner are placed into contact. Since the bonding members are slightly resilient, a tight joint can be attained between adjacent liners.

Although the liners may cover the entire internal surface of a cage, Fig. 3 illustrates a partially lined conduit. In making this type of conduit, after all of the desired liners have been attached to the interior of the cage, an inner shell, indicated in dotted lines at 60 and having the desired shape or configuration, is placed in overlapping relation to the end tile, such as the tile 10x and 10y and the formation of the outer covering or monolithic coating can proceed. The entire external surface of the cage is now provided with a monolithic coating 62 of a cementitious composition such as a Portland cement-sand mortar, or a suitable Portland cement concrete. This monolithic coating comes in contact with the rear faces of the liners 10, extends beneath the cage members 50, 51, 52, etc. and also completely envelops the clips 55. The cementitious composition may be applied to any desired thickness so as to thoroughly cover the cage. The cementitious composition may be cast, troweled or sprayed upon the outer surface of the cage. Portland cement concrete mixtures can be forced against the outer surface of the partly assembled conduit by the use of compressed air.

After the cementitious composition 62 has attained its initial set, it is preferably cured and steam curing at temperatures of 140°–160° F. is preferred. During such curing the bonding members 40 soften and become tacky, blending together and forming an impermeable seal or joint between adjoining ceramic liners.

It will be evident from the description given hereinabove that a rapid, facile and economical method of manufacturing large pipe and conduit has been provided. By providing each of the clay liners with a resilient bonding member prior to the attachment of the liners to the cage, accuracy, uniform spacing and tight joints are attained. Moreover, the adherent, resilient bonding members carried by the individual liners prevent chipping of the edges and protect the glazed, resistant, inner faces of the liners from being damaged, thereby preventing subsequent leakage or weakened areas through which the corrosive liquids may attack the tile and concrete. Rapidity of construction is facilitated. The clay liners themselves may be shipped as an article of commerce and the entire conduit or tank manufactured in close proximity to the site of use or installation.

It is to be understood that the invention is not limited to the precise examples illustrated. The clay tile may be installed in staggered relation within a cage; the longitudinal and transverse edges of the liners may be provided with indentations or grooves arranged to grasp and hold the bonding members. Instead of asphaltic composition, rubber-like compositions containing various polymers, synthetic rubbers, condensation products, and the like may be employed. All changes and modifications coming within the scope of the appended claims are embraced thereby.

I claim:

1. A pipe or conduit comprising: a cage composed of parallel reenforcing rods extending longitudinally of the conduit and spaced from each other; a plurality of circumferentially disposed, longitudinally spaced, curved rods fastened to the longitudinal rods; ceramic liners provided with resistant inner faces, positioned within the cage in adjacent relation, the rear face of each liner carrying a longitudinally extending, headed integral rib in contact with not less than two of the circumferential rods; the longitudinally extending sides and transversely extending ends of each liner being provided with an adherent, resistant and resilient bonding member; and a monolithic, cementitious, outer layer in contact with rear faces of the liners and covering said ribs and cage.

2. A pipe or conduit comprising: a cage composed of parallel reenforcing rods extending longitudinally of the conduit and spaced from each other; a plurality of circumferentially disposed, longitudinally spaced, curved rods fastened to the longitudinal rods; ceramic liners provided with resistant inner faces, positioned within the cage in adjacent relation, the rear face of each liner carrying a longitudinally extending, headed integral rib in contact with not less than two of the circumferential rods; said liners being spaced from each other by a bonding material of asphaltic composition; and a monolithic, cementitious, outer layer in contact with rear faces of the liner and covering said ribs and cage.

3. In a method of making large conduit provided with a ceramic inner liner, the steps of: forming a rigid, foraminous cage of desired diameter; lining said cage with ceramic liners in contact with the cage and attaching them to said cage; coating the external surfaces of the liners and cage with a hydraulic cement composition; and curing said composition and simultaneously bonding contacting edge surfaces of the liners to each other.

4. A ceramic liner for use in conduits and tanks comprising: a ceramic slab having a resistant front face, a rear face, longitudinally extending sides and ends, the sides and ends carrying an adherent, resistant, resilient bonding member; the external surfaces of the bonding member on the ends being in planes perpendicular to the front face of the slab, while the outer surfaces of the bonding member on the sides lie in planes inclined to the front face and virtually coincidental with planes passing through the center of a conduit in which the liner is installed.

5. A ceramic liner of the character stated in claim 4, wherein the bonding member is of asphaltic composition cast upon the ends and sides of the slab.

6. A ceramic liner of the character stated in claim 4, wherein the front face of the slab is glazed and the rear face is provided with a pair of longitudinally extending, headed ribs.

7. A ceramic liner of the character stated in claim 4, wherein the bonding member continuously extends around the sides and ends of the slab and the rear face is provided with a pair of longitudinally extending, headed ribs.

8. A ceramic liner for use in conduits and tanks comprising: a ceramic slab provided with a glazed front face, a rear face, longitudinally extending sides and ends, said sides and ends lying in planes perpendicular to said front face; a pair of spaced, longitudinally extending headed ribs carried by the rear face of the slab and integral therewith; and resilient jointing means carried by the longitudinally extending sides, said jointing means being arranged to form a tight joint between said liners when the latter are arranged about a common center.

HOWARD W. JEWELL.

References Cited in the file of this patent

UNITED STATES PATENTS

| Number | Name | Date |
|---|---|---|
| 1,050,137 | Horner | Jan. 14, 1913 |
| 1,076,611 | Siegwart | Oct. 21, 1913 |
| 1,120,706 | Flannery | Dec. 15, 1914 |
| 1,155,411 | Flannery | Oct. 5, 1915 |